(12) United States Patent
Xiao et al.

(10) Patent No.: US 10,182,275 B1
(45) Date of Patent: Jan. 15, 2019

(54) PASSIVE OPTICAL SUBASSEMBLY WITH A SIGNAL PITCH ROUTER

(71) Applicant: ALLIANCE FIBER OPTIC PRODUCTS, INC., Sunnyvale, CA (US)

(72) Inventors: Qijun Xiao, Fremont, CA (US); Andy Fenglei Zhou, Fremont, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 15/851,844

(22) Filed: Dec. 22, 2017

(51) Int. Cl.
*H04Q 11/00* (2006.01)
*H04J 14/02* (2006.01)
*H04B 10/25* (2013.01)

(52) U.S. Cl.
CPC ..... *H04Q 11/0005* (2013.01); *H04B 10/2504* (2013.01); *H04J 14/02* (2013.01); *H04Q 2011/0009* (2013.01); *H04Q 2011/0016* (2013.01)

(58) Field of Classification Search
CPC ....... H04Q 11/0005; H04Q 2011/0016; H04Q 2011/0009; H04B 10/2504; H04J 14/02
USPC ......................................................... 398/82
See application file for complete search history.

(56) References Cited

U.S. PATENT DOCUMENTS

| | | | |
|---|---|---|---|
| 6,485,149 B1 * | 11/2002 | Berg ..................... | G02B 5/265 359/558 |
| 6,751,373 B2 | 6/2004 | Jeong | |
| 6,941,047 B2 * | 9/2005 | Capewell .......... | G02B 6/29367 385/33 |
| 7,912,374 B1 * | 3/2011 | Wang .................. | G02B 3/0087 359/634 |
| 2008/0166094 A1 | 7/2008 | Bookbinder et al. | |
| 2009/0169163 A1 | 7/2009 | Abbott, III et al. | |

* cited by examiner

*Primary Examiner* — Leslie C Pascal
(74) *Attorney, Agent, or Firm* — Robert L. Branham

(57) ABSTRACT

Disclosed herein is wavelength-division multiplexer with an internal optical signal tuned by a mounted signal pitch router. In particular, disclosed is a wavelength-division multiplexing (WDM) optical assembly including an optical signal router, a WDM filter, and a signal pitch router. The WDM filter has a wavelength selective surface positioned proximate the second side of the optical signal router. The signal pitch router has a transmissive surface positioned proximate to a side of the optical signal router, and a second reflective surface opposite the transmissive surface. A depth of the signal pitch router establishes and tunes a pitch of a routing optical path within the optical signal router. This provides for easier, faster, more reliable, and more cost effective manufacturing and assembly of the WDM optical assembly.

20 Claims, 7 Drawing Sheets

PASSIVE OPTICAL SUBASSEMBLY WITH A SIGNAL PITCH ROUTER

BACKGROUND

The disclosure relates to wavelength-division multiplexing and demultiplexing, and more particularly, to passive optical subassemblies with a signal pitch router to tune an optical signal path within an optical signal router.

Wavelength-division multiplexing (WDM) is a technology that multiplexes (e.g., adds) a number of distinct wavelengths of light onto a single optical fiber and demultiplexes (e.g., divides) a number of distinct wavelengths of light from a single optical fiber, thereby increasing information capacity and enabling bi-directional flow of signals. Multiple optical signals are multiplexed with different wavelengths of light combined by a multiplexer at a transmitter, directed to a single fiber for transmission of the signal, and split by a demultiplexer to designated channels at a receiver. By combining multiple channels of light into a single channel, WDM assemblies and associated devices can be used as components in an optical network, such as a passive optical network (PON).

Some optical assemblies are active optical subassemblies that require active individual tuning of the WDM filters, such as in configurations where the WDM filters are mounted separate from reflective surfaces (e.g., mirrors). In such a configuration, the WDM filters can be tuned by rotation or translation of the WDM filter relative to the common port, reflective surfaces, and/or channel ports. In other words, component placement and orientation is independent of one another.

However, in certain optical assemblies (e.g., passive optical sub-assemblies (POSA)), WDM filters may be mounted directly to a glass block, where the glass block operates as an optical signal router. By mounting the WDM filters directly to the glass block, tuning can be difficult and time consuming, if even possible. This is because the WDM filters are mounted to the glass block such that they must be placed and oriented collectively. In other words, placement and orientation of the glass block and WDM filters are dependent on one another. A lack of effective optical signal tuning for such configurations can lead to higher costs, higher fail rates, and/or less compact configurations.

No admission is made that any reference cited herein constitutes prior art. Applicant expressly reserves the right to challenge the accuracy and pertinency of any cited documents.

SUMMARY

Disclosed herein is wavelength-division multiplexer with an internal optical signal tuned by a mounted signal pitch router. In particular, disclosed is a wavelength-division multiplexing (WDM) optical assembly including an optical signal router, a WDM filter, and a signal pitch router. The optical signal router has a first side and a second side opposite the first side configured to reflect an optical signal therein. The WDM filter has a wavelength selective surface positioned proximate the second side of the optical signal router. The signal pitch router has a first transmissive surface and a second reflective surface opposite the first transmissive surface. The first transmissive surface is positioned proximate to (e.g., mounted to) the second side of the optical signal router. In this way, a depth of the signal pitch router (i.e., distance between the first transmissive surface and the second reflective surface) establishes a pitch of a routing optical path within the optical signal router. Accordingly, during manufacturing of the WDM optical assembly, the pitch of the routing optical path within the optical signal router is tuned by configuring the signal pitch router with a pre-determined thickness (e.g., by selecting one of a plurality of signal pitch routers of varying thicknesses). This provides for easier, faster, more reliable, and more cost effective manufacturing and assembly of the WDM optical assembly.

One embodiment of the disclosure relates to a wavelength-division multiplexing (WDM) optical assembly. The WDM optical assembly includes an optical signal router, a first WDM filter, and a signal pitch router. The optical signal router has a first side and a second side opposite the first side. At least a portion of the first side includes a reflective surface, and at least a portion of the second side includes a transmissive surface. The first WDM filter has a first wavelength selective surface positioned proximate the second side of the optical signal router. The signal pitch router has a first surface and a second surface opposite the first surface. At least a portion of the first surface includes a transmissive surface and at least a portion of the second surface includes a reflective surface. The first surface of the signal pitch router is positioned proximate the second side of the optical signal router, and a depth between the second surface of the signal pitch router and the first surface of the optical signal router is configured to establish a pitch of a routing optical path within the optical signal router. The signal pitch router is positioned relative to the first WDM filter to form at least a portion of the routing optical path between the first WDM filter and a common port configured for optical communication of multiplexed signals.

An additional embodiment of the disclosure relates to a WDM optical assembly including an optical signal router, a WDM filter, and a signal pitch router. The optical signal router has a first side and a second side opposite the first side. The WDM filter has a wavelength selective surface positioned proximate the optical signal router. The signal pitch router has a first surface and a second surface opposite the first surface. At least a portion of the first surface includes a transmissive surface, and at least a portion of the second surface includes a reflective surface. The first surface of the signal pitch router is positioned proximate the second side of the optical signal router, and a depth between the second surface of the signal pitch router and the first surface of the optical signal router is configured to establish a pitch of a routing optical path within the optical signal router.

An additional embodiment of the disclosure relates to a method of manufacturing a WDM optical assembly. The method includes positioning a first wavelength selective surface of a first WDM filter proximate to the optical signal router. The optical signal router has a first side and a second side opposite the first side. At least a portion of the first side includes a reflective surface and at least a portion of the second side includes a transmissive surface. The method further includes positioning a signal pitch router relative to an optical signal router. The signal pitch router has a first surface and a second surface opposite the first surface. At least a portion of the first surface comprises a transmissive surface and at least a portion of the second surface comprises a reflective surface. The first surface of the signal pitch router is positioned proximate the second side of the optical signal router, and a depth between the second surface of the signal pitch router and the first surface of the signal pitch router establishes a pitch of a routing optical path within the optical signal router.

An additional embodiment of the disclosure relates to a WDM device. The WDM device includes a housing, a common collimator configured for optical communication of multiplexed signals positioned within the housing, a common fiber optic pigtail operatively coupled to the first common collimator and extending from the housing, a first channel collimator configured for optical communication of demultiplexed signals positioned within the housing, a first channel fiber optic pigtail operatively coupled to the first channel collimator and extending from the housing, a second channel collimator configured for optical communication of demultiplexed signals positioned within the housing, a second channel fiber optic pigtail operatively coupled to the second channel collimator and extending from the housing, and a WDM optical assembly. The WDM optical assembly includes a signal pitch router, an optical signal router, and a first WDM filter. The signal pitch router has a first surface and a second surface opposite the first surface. At least a portion of the first surface includes a transmissive surface and at least a portion of the second surface includes a reflective surface. The optical signal router has a first side and a second side opposite the first side. At least a portion of the first side includes a reflective surface, and at least a portion of the second side includes a transmissive surface. The first WDM filter has a first wavelength selective surface positioned proximate the second side of the optical signal router. The first WDM filter is positioned to form a first optical path with a first channel collimator and a second optical path with a second channel collimator. The first surface of the signal pitch router is positioned proximate the second side of the optical signal router, and a depth between the second surface of the signal pitch router and the first surface of the optical signal router is configured to establish a pitch of a routing optical path within the optical signal router. The signal pitch router is positioned relative to the first WDM filter to form at least a portion of the routing optical path within the optical signal router. The routing optical path between the first WDM filter and a common collimator is configured for optical communication of multiplexed signals.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1A:
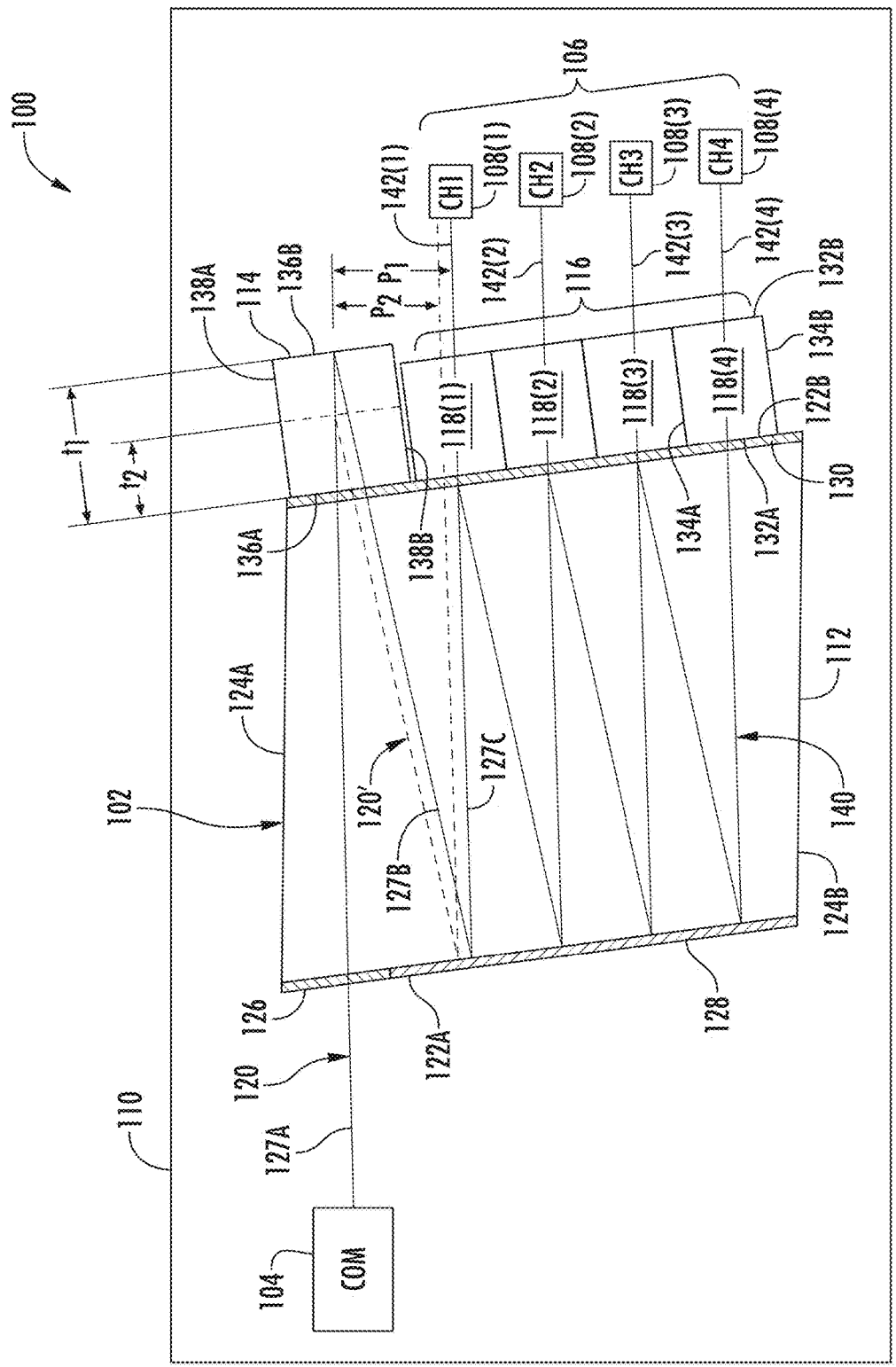
FIG. 1A is a top view of a WDM optical assembly with a signal pitch router mounted to an optical signal router.

Reference will now be made in detail to the present preferred embodiments, examples of which are illustrated in the accompanying drawings. Whenever possible, the same reference numerals will be used throughout the drawings to refer to the same or like parts.

The terms "left," "right," "top," "bottom," "front," "back," "horizontal," "parallel," "perpendicular," "vertical," "lateral," "coplanar," and similar terms are used for convenience of describing the attached figures and are not intended to limit this description. For example, the terms "left side" and "right side" are used with specific reference to the drawings as illustrated and the embodiments may be in other orientations in use. Further, as used herein, the terms "horizontal," "parallel," "perpendicular," "vertical," "lateral," etc., include slight variations that may be present in working examples.

Disclosed herein is wavelength-division multiplexer with an internal optical signal tuned by a mounted signal pitch router. In particular, disclosed is a wavelength-division multiplexing (WDM) optical assembly including an optical signal router, a WDM filter, and a signal pitch router. The optical signal router has a first side and a second side opposite the first side configured to reflect an optical signal therein. The WDM filter has a wavelength selective surface positioned proximate the second side of the optical signal router. The signal pitch router has a first transmissive surface and a second reflective surface opposite the first transmissive surface. The first transmissive surface is positioned proximate to (e.g., mounted to) the second side of the optical signal router. In this way, a depth of the signal pitch router (i.e., distance between the first transmissive surface and the second reflective surface) establishes a pitch of a routing optical path within the optical signal router. Accordingly, during manufacturing of the WDM optical assembly, the pitch of the routing optical path within the optical signal router is tuned by configuring the signal pitch router with a pre-determined thickness (e.g., by selecting one of a plurality of signal pitch routers of varying thicknesses). This provides for easier, faster, more reliable, and more cost effective manufacturing and assembly of the WDM optical assembly.

FIG. 1A is a top view of a micro-optical assembly 100 (may also be referred to as a multiplexer/demultiplexer). The micro-optical assembly 100 includes a WDM optical assembly 102, a common port 104, an channel port array 106 including a plurality of channel ports 108(1)-108(4) (referred to generally as channel ports 108, and may also be referred to as a plurality of input/output ports), and a substrate 110. In certain embodiments, the micro-optical assembly 100 may include a housing (not illustrated) that defines a WDM module.

The WDM optical assembly 102, a common port 104, and/or channel ports 108 are typically mounted to and supported by an upper surface of the substrate 110. In certain embodiments, the common port 104 and/or the channel ports 108 may be embodied as collimators (e.g., micro-collimators) as described below with respect to FIGS. 3-7. As used herein, the term port means a location or device at which a signal or signals enter the WDM optical assembly 102, exit the WDM optical assembly 102, or enter and exit the WDM optical assembly 102.

The WDM optical assembly 102 includes an optical signal router 112 (may also be referred to as a signal-routing block), a signal pitch router 114, and a WDM filter array 106 (may also be referred to as a capillary filter block) which includes a plurality of WDM filters 118(1)-118(4) (referred to generally as WDM filters 118, and may also be referred to as component filter blocks). The WDM optical assembly 102 forms an optical signal path 120 between the common port 104 and the channel ports 108.

The optical signal router 112 includes a first side 122A, a second side 122B opposite the first side 122A, and first and second lateral sides 124A, 124B extending between the first side 122A and the second side 122B. In particular, the sides 122A-124B generally form a parallelogram prism, where sides 122A, 122B are non-perpendicularly angled relative to first and second sides 124A, 124B. The first side 122A includes an anti-reflective (AR) coating 126 (may also be referred to as an AR film, AR portion, transmissive coating, transmissive film, transmissive portion, etc.) towards and extending from the first lateral side 122A. This anti-reflection coating 126 may comprise a multi-layer thin-film filter structure or a textured lens surface. A first portion 127A of the optical signal path 120 extends from the common port 104 through the AR coating 126 of the first side 122A.

The first side 122A of the optical signal router 112 also includes a highly-reflective (HR) coating 128 (may also be referred to as a HR film, HR portion, reflective coating, reflective film, reflective portion, etc.) towards and extending from the second lateral side 124B. As explained in more detail below, a second portion 127B of the optical signal path 120 is reflected off the HR coating 128 of the first side 122A of the optical signal router 112, where a third portion 127C of the optical signal path 120 continues to the first WDM filter 118(1).

The second side 122B of the optical signal router 112 includes an AR coating 130 along at least a portion of the second side 122B. In certain embodiments, the AR coating 130 extends the entirety of the second side 122B from the first lateral side 124A to the second lateral side 124B. In certain embodiments, at least a portion of the second side 122B includes a HR coating. The WDM filter array 116 (may also be referred to as a capillary filter block) is proximate to, mounted to, and/or abuts the second side 122B of the optical signal router 112. In some embodiments, for example, the WDM filters 118 are mounted to the second side 122B of the optical signal router 112. Each WDM filter 118(1)-118(4) includes a first surface 132A, a second surface 132B opposite the first surface 132A, and first and second lateral surfaces 134A, 134B extending between the first and second surfaces 132A, 132B.

Each of the first surfaces 132A of the WDM filters 118 is wavelength selective. In other words, the first surface 132A has a unique passband (e.g., coating, thin film filter, etc.) to allow a portion of the optical signal to pass through the WDM filter 118 and to reflect the remaining portion of the optical signal towards the HR coating 128 of the optical signal router 112, which in turn reflects the remaining portion of the optical signal towards another one of the remaining WDM filters 118. In particular, the first surface 132A (with the passband coating) of the WDM filters 118 is proximate to, mounted to, and/or abutting the second side 122B of the optical signal router 112. Accordingly, the WDM filters 118 share a common filter plane (against the second side 122B of the optical signal router 112). Mounting the WDM filters 118 against the second side 122B of the optical signal router 112 ensures that the optical signal path between successive WDM filters 118 remains within the optical signal router 112. In such a configuration, tuning is simplified, more reliable and more predictable, as the WDM filters 118 do not need to be individually tuned. If the WDM filters 118 are pressed against the second side 122B of the optical signal router 112, the optical path 120 within the optical signal router is very reliable and predictable. Comparatively, if the first surface was transmissive and the second surface was wavelength selective, then each WDM filter 118 would have to be individually tuned to ensure that the optical signal is aligned with the respective channel port 108 and also aligned with successive WDM filters 118.

In certain embodiments, an index-matching adhesive is positioned between the WDM filter array 116 and the optical signal router 112. In certain embodiments, the WDM filters 116 of the WDM filter array 116 are secured together with a capillary adhesive. In particular embodiments, the capillary adhesive may comprise an epoxy resin and a polyamine hardener. In certain embodiments, the index-matching adhesive and the capillary adhesive may comprise different or substantially identical adhesives. In certain embodiments, the refractive index of the index-matching adhesive matches the refractive index of the optical signal router 112 and the WDM filters 118.

The WDM filter array 116 and the optical signal router 112 are arranged such that a multiplexed optical signal entering optical signal router 112 from the common port 104 can pass through the optical signal router 112 and between the WDM filters 118 of the WDM filter array 116 in a back-and-forth progression (e.g., routing optical path 140, discussed in more detail below) to successive ones of the WDM filters 118 for successive wavelength-selective transmission and reflection at the channel ports 108. Additionally, the WDM filter array 116 and the optical signal router 112 are arranged such that demultiplexed optical signals entering the optical signal router 112 from the channel ports 108 can pass through the optical signal router and between the WDM filters 118 of the WDM filter array 116 in a back-and-forth progression (e.g., routing optical path 140, discussed in more detail below) for multiplexing at successive ones of the WDM filters 118 and multiplexed transmission to the common port 104. In particular, the common port 104 serves as an input/output (I/O) port for a multi-wavelength light having wavelengths $\lambda_1$ to $\lambda_4$ while the channel ports 108 serve as the four individual channel ports. The WDM filters 118 are respectively configured to transmit wavelengths $\lambda_1$, $\lambda_2$, $\lambda_3$, and $\lambda_4$ and reflect the other wavelengths. In a DeMux operation, the multi-wavelength light exits the common port 104 that defines the I/O port and travels towards the first WDM filter 118(1). The first WDM filter 118(1) transmits the wavelength $\lambda_1$ to the first channel port 108(1) and reflects the remaining wavelengths $\lambda_2$, $\lambda_3$, and $\lambda_4$ of multi-wavelength light. This reflected multi-wavelength light then proceeds to the second WDM filter 118(2), which transmits the wavelength $\lambda_2$ to the second channel port 108(2) and reflects the remaining wavelengths $\lambda_3$ and $\lambda_4$ of multi-wavelength light. This process is repeated for the remaining two optical filters 118(3) and 118(4) and channel ports 108(2), 108(3) so that the wavelength components $\lambda_1$, $\lambda_2$, $\lambda_3$, and $\lambda_4$ of the multi-wavelength light are distributed to their respective channel ports 108(3), 108(4). In the Mux operation, the direction of the light is reversed and the individual wavelengths $\lambda_1$, $\lambda_2$, $\lambda_3$, and $\lambda_4$ from the individual channel ports 108(1)-108(4) are recombined by the optical filters 118(1)-118(4) into common port 104.

The signal pitch router 114 has a first transmissive surface 136A (e.g., the entire first surface 136A includes a transmissive surface), a second reflective surface 136B (e.g., the entire second surface 136B includes a reflective surface) opposite the first transmissive surface 136A, and first and second lateral surfaces 138A, 138B extending between the first transmissive surface 136A and the second reflective surface 136B. The first transmissive surface 136A is positioned proximate to, mounted to, and/or abutting the second side 122B of the optical signal router 112. The second reflective surface 136B is positioned distally from the optical signal router 112. In certain embodiments, the second reflective surface 136B of the second surface 136B includes a wavelength selective surface. In certain embodiments, the second reflective surface 136B includes a mirror. In other words, the second reflective surface 136B of the signal pitch router 114 is offset from the common filter plane of the WDM filter array 116. In this way, a depth of the signal pitch router 114 (i.e., distance ti from the first transmissive surface 136A to the second reflective surface 136B) establishes a pitch of the optical path 120 within the optical signal router 112. Accordingly, during manufacturing of the WDM optical assembly 102, the pitch of the routing optical path 140 within the optical signal router 112 is tuned by configuring the signal pitch router 114 with a pre-determined thickness (e.g., by selecting one of a plurality of signal pitch routers of varying thicknesses). This provides for easier, faster, more reliable, and more cost effective manufacturing and assembly of the WDM optical assembly 102.

The optical routing path 120 extends at the first portion 127A from the common port 104, through the first side 122A of the optical signal router 112 through the AR coating 130 of the second side 122B of the optical signal router 112, through the first transmissive surface 136A of the signal pitch router 114 to the second reflective surface 136B of the signal pitch router 114. The second portion 127B of the optical signal path 120 is then reflected off the second reflective surface 136B of the signal pitch router 114 and extends back through the first surface 136A of the signal pitch router 114, through the second side 122B of the optical signal router 112, and to the HR coating 128 of the first side 122A of the optical signal router 112. The third portion 127C then proceeds to the first WDM filter 118(1). The portion of the optical signal path 120 within the optical signal router 112 may also be referred to as a routing optical path 140, and the portion of the optical signal path 120 outside of the signal router 112 may be referred to as a WDM optical path 142(1)-142(4). For example, the portion of the optical path 120 between the first WDM filter 118(1) and the first channel port 108 may be referred to as a first WDM optical path 142(1).

The pitch of the routing optical path 140 of the optical signal path 120' within the optical signal router 112 depends on the thickness of the signal pitch router 114. The pitch of the routing optical path 140 determines a distance between the portion of the optical routing path associated with the common port 104 (e.g., the first portion 127A of the optical routing path 120 in FIG. 1A) and the next adjacent WDM optical path (e.g., the first WDM optical path 142(1) in FIG. 1A). For example, a thickness of $T_1$ of the signal pitch router 114 results in a pitch $P_1$ of the optical signal path 120'. However, a decreased thickness of $T_2$ (where $T_2$ is less than $T_1$), results in a pitch $P_2$ of the optical signal path 120', where pitch $P_2$ is less than pitch $P_1$. Accordingly, an increased thickness of the signal pitch router 114 results in an increased pitch. In this way, varying the thickness of the optical signal router 112 alters the pitch of the optical signal path 120 within the optical signal router 112. In particular, during manufacturing of the WDM optical assembly 102, the WDM filter array 116 can be mounted to the optical signal router 112. Then one of a plurality of signal pitch routers 114 of varying thicknesses can be chosen and used to tune the optical signal path 120 (the pitch of the optical signal path 120) within the optical signal router 112. This tuning may be needed to adjust alignment of the optical signal path 120 with respect to the WDM filters 118 and their respective channel ports 108.

In certain embodiments, the signal pitch router 114 is mounted to a different side of the optical signal router 112 than the WDM filters 118. For example, in certain embodiments, the common port 104 is on the same side of the optical signal router 112 as the channel ports 108. In such a circumstance, the signal pitch router 114 is positioned proximate to, mounted to, and/or abuts the first side 122A of the optical signal router 112.

In certain embodiments, the optical signal router 112, the signal pitch router 114, and/or the WDM filters 118 comprise glass blocks, such as glass blocks characterized by a refractive index of between about 1.523 and about 1.517, at 1300 nm. In certain embodiments, each of the plurality of WDM filters 118 is configured such that the wavelength-selective transmission and reflection at the channel ports 108 is operative between about 1260 nm and about 1360 nm and is characterized by a bandwidth and channel spacing of between about 10 nm and about 30 nm.

In certain embodiments, the WDM channels (i.e., the common port 104 and/or the channel ports 108) can be dense WDM (DWDM) channels or coarse WDM (CWDM) channels. The micro-optical assembly 100 can be used to form many types of free-space optical fiber devices, as well as compact variable optical attenuators, switches, optical amplifiers, taps, optical couplers/splitters, optical circulators, optical isolators, optical time-domain reflectometer (OTDRs), etc.

The common port 104, channel ports 108, and/or WDM optical assembly 102 can be secured to the upper surface of the substrate 110 using an adhesive, glass soldering and/or glass welding using a laser. In certain embodiments, no adhesive is used in securing the common port 104, channel ports 108, and/or WDM optical assembly 102 to the upper surface of the support substrate 110. A no-adhesive embodiment of the micro-optical assembly 100 may be preferred in cases where uncertainty in the reliability of the adhesive is a concern. In certain embodiments, the support substrate 110 is made of glass (e.g., quartz) or sapphire. In another embodiment, the support substrate 110 is made of a glass that is receptive to the formation of glass bumps. In other embodiments, the support substrate 110 can be made of stainless steel or silicon, a low-CTE metal alloy (e.g., having a CTE of <10 ppm/° C., or more preferably CTE<5 ppm/° C., or even more preferably CTE<1 ppm/° C.). Examples of metal alloys having such a low CTE include the nickel-iron alloy 64FeNi also known in the art under the registered trademarked INVAR® alloy, or the nickel-cobalt ferrous alloy known in the art under the registered trademark KOVAR® alloy. In certain embodiments, the upper surface is precision polished to be flat to within a tolerance of 0.005 mm so that the collimators can be precision mounted to the upper surface. In certain embodiments, the bottom side of the collimators can be processed (e.g., polished, including laser performing laser polishing) to a tolerance similar to that of the upper surface of the support substrate. In certain embodiments, the support substrate 110 includes one or more reference features, such as alignment fiducials, for positioning and/or aligning the micro-collimators and other optical components (e.g., optical filters, other micro-collimators, etc.).

Figure 1B:
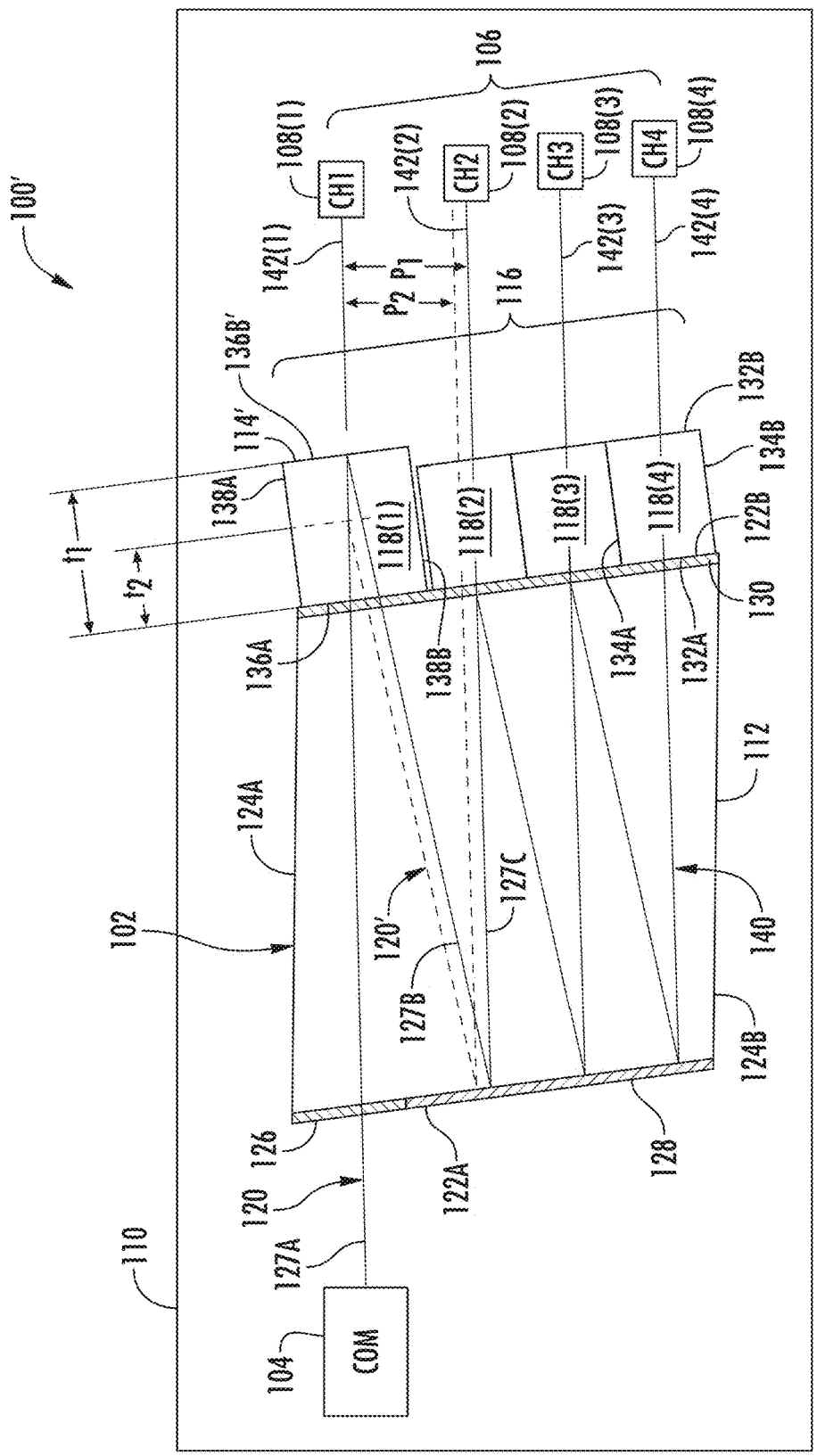
FIG. 1B is a top view of another embodiment of the WDM optical assembly of FIG. 1A with the signal pitch router embodied as a WDM filter.

FIG. 1B is a top view of another embodiment of the WDM optical assembly of FIG. 1A with a signal pitch router 114' also functioning as a first WDM filter 118(1). The WDM optical assembly 102' operates as described above with respect to FIG. 1A, except where otherwise noted. In particular, the signal pitch router 114' includes a first transmissive surface 136A, a second wavelength selective surface 136B' opposite the first transmissive surface 136A, and first and second lateral surfaces 124A, 124B extending between the first transmissive surface 136A and the second reflective surface 136B'. The first transmissive surface 136A is positioned proximate to, mounted to, and/or abutting the second side 122B of the optical signal router 112. The second wavelength selective surface 136B' is positioned distally from the optical signal router 112.

As described above, the thickness of the signal pitch router 114' adjusts the pitch of the optical signal path 120 within the optical signal router 112. In the embodiment of FIG. 1B, the pitch determines a distance (e.g., $P_1$ or $P_2$) between the first WDM optical path 142(1) and the second WDM optical path 142(2). Additionally, the signal pitch router 114' acts as the first WDM filter 118(1) and transmits the wavelength $\lambda_1$ to the first channel port 108(1) and reflects the remaining wavelengths $\lambda_2$, $\lambda_3$, and $\lambda_4$ of multi-wavelength light. It is noted that, as above, the first surface 132A (with the passband coating) of the remaining WDM filters 118(2)-118(4) is proximate to, mounted to, and/or abutting the second side 122B of the optical signal router 112. Accordingly, the WDM filters 118(2)-118(4) share a common filter plane (against the second side 122B of the optical signal router 112), that is offset from the filter plane of the first WDM filter 118(1). In other words, the orientation of the first WDM filter 118(1) is flipped (i.e., reversed, backwards) from that of the other WDM filters 118(2)-118(4) mounted to the second side 122B of the optical signal router 102.

Figure 2:
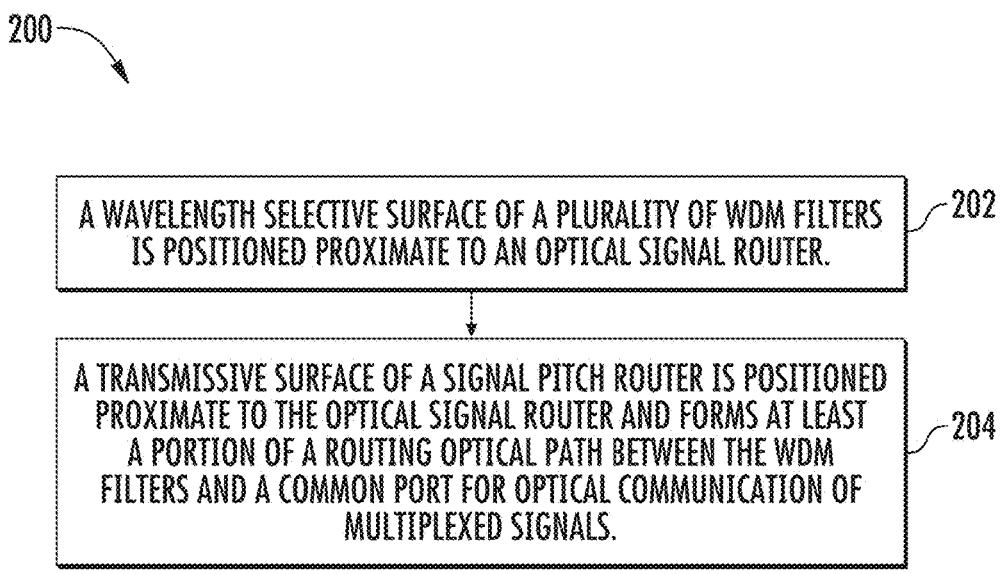
FIG. 2 is a flowchart of steps for tuning WDM optical assemblies of FIGS. 1A-1B by adjusting a thickness of the signal pitch router.

FIG. 2 is a flowchart 200 of steps for tuning a WDM optical assembly by adjusting a thickness of a signal pitch router mounted to an optical signal router. In step 202, a wavelength selective surface of a plurality of WDM filters is positioned proximate to (e.g., mounted to) an optical signal router (e.g., a second side of the optical signal router). In step 204, a transmissive surface of a signal pitch router is positioned proximate to (e.g., mounted to) the optical signal router (e.g., a second side of the optical signal router) and forms at least a portion of a routing optical path between the WDM filters and a common port for optical communication of multiplexed signals. A depth of the signal pitch router establishes a pitch of a routing optical path within the optical signal router.

FIGS. 3-6B are views of collimators for use with the WDM optical assemblies of FIGS. 1A-1B.

Figure 3:
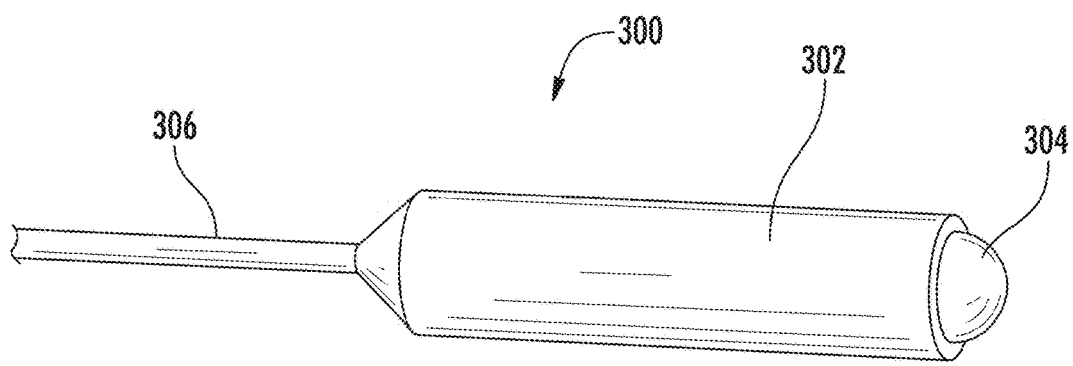
FIG. 3 is a perspective view of a steel-tube collimator for use with the WDM optical assemblies of FIGS. 1A-1B.

FIG. 3 is a perspective view of a steel-tube collimator 300 for use with the WDM optical assemblies of FIGS. 1A-1B. The collimator narrows a beam of particles or waves. In other words, the collimator causes the directions of motion to become more aligned in a specific direction. The steel-tube collimator 300 includes a steel-tube body 302, with a curved lens 304 at one end of the steel-tube body, and a fiber optic pigtail 306 at an opposite end of the steel-tube body.

Figure 4A:
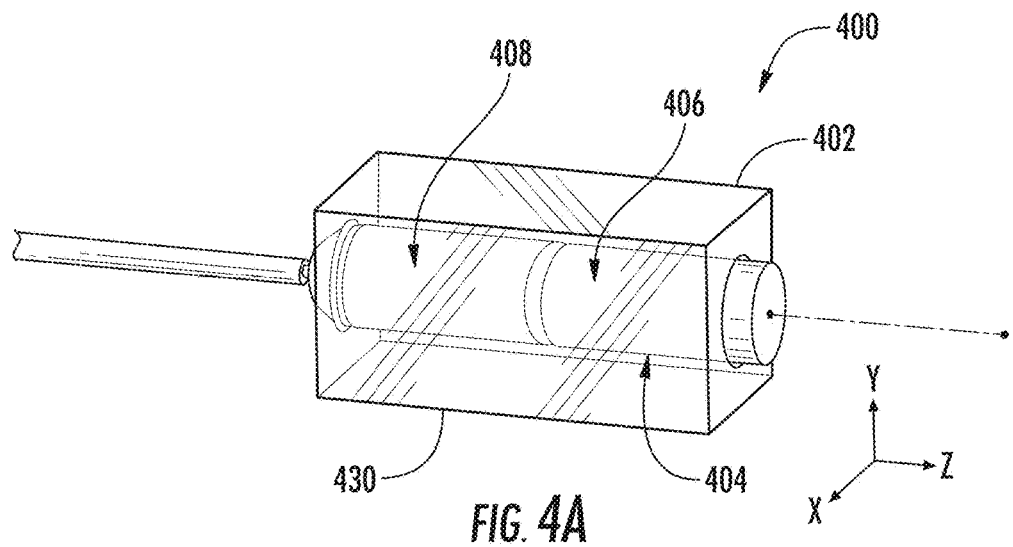
FIG. 4A is a perspective view of a square tube collimator for use with the WDM optical assemblies of FIGS. 1A-1B.
Figure 4B:
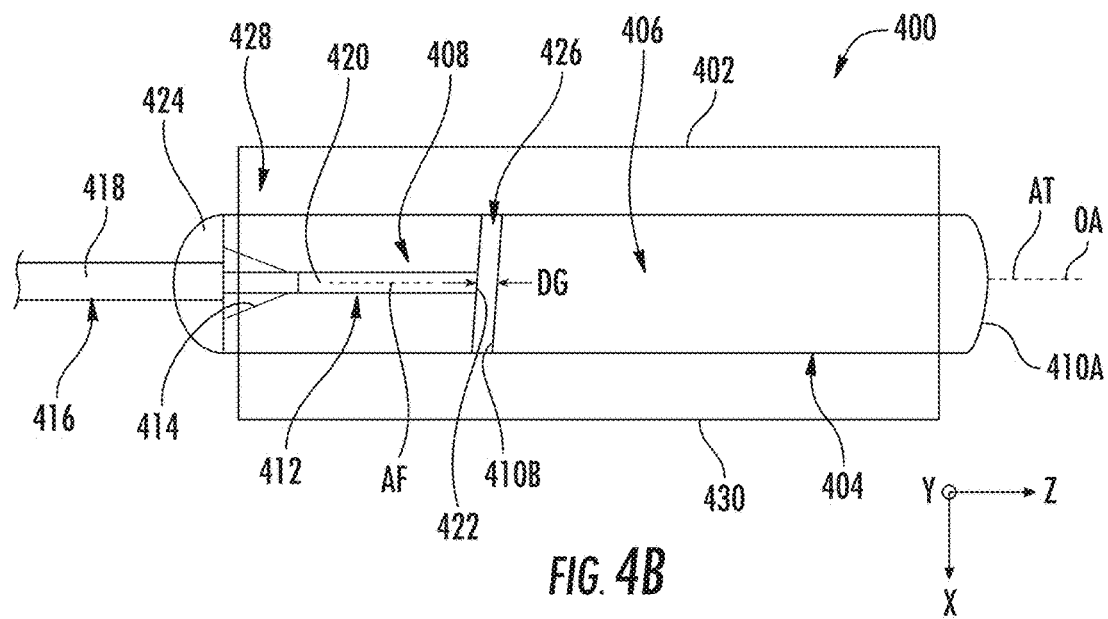
FIG. 4B is a cross-sectional top view of the square tube collimator of FIG. 4A.

FIGS. 4A and 4B are perspective views of a square tube collimator for use with the WDM optical assemblies of FIGS. 1A-1B. The square tube collimator 400 includes a glass tube 402 (e.g., cylindrical) with a central bore 404. As used herein, the term "cylindrical" is used in its most general sense and can be defined as a three-dimensional object formed by taking a two-dimensional object and projecting it in a direction perpendicular to its surface. Thus, a cylinder, as the term is used herein, is not limited to having a circular cross-section shape but can have any cross-sectional shape, such as the square cross-sectional shape described below by way of example.

The square tube collimator 900 further includes optical elements, such as a collimating lens 406, ferrule 408, etc., which can be secured to the glass tube 402 using a securing mechanism (e.g., an adhesive). The collimating lens 406 has a front surface 410A and a back surface 410B opposite thereto. In the example shown, the front surface 410A is convex while the back surface 410B can be angled, e.g., in the x-z plane as shown. In an example, the front surface 410A of collimating lens 406 can reside outside of the central bore 404, i.e., the front-end portion of the collimating lens 406 can extend slightly past the front end of the glass tube 402. In an example, the collimating lens 406 can be formed as a gradient-index (GRIN) element that has a planar front surface 410A. In an example, the collimating lens 406 can consist of a single lens element while in another example it can consist of multiple lens elements. In the discussion below, the collimating lens 406 is shown as a single lens element for ease of illustration and discussion.

The optical fiber support member is the form of a ferrule 408. The ferrule 408 includes a central bore 412 that runs between a front end and a back end along a ferrule central axis AF, which in an example is co-axial with the tube central axis AT of the glass tube 402 and the optical axis OA as defined by the collimating lens 406. The central bore 412 can include a flared portion 414 at the back end of the ferrule 408.

An optical fiber 416 has a coated portion 418, and an end portion 420 is bare glass (e.g., is stripped of the coated portion) and is thus referred to as the "bare glass portion." The bare glass portion 420 includes a polished end face 422 that defines a proximal end of the optical fiber. The bare glass portion 420 of the optical fiber 416 extends into the central bore 412 of the ferrule 408 at the back end of the ferrule. A securing element 424 can be disposed around the optical fiber 416 at the back end of the ferrule 408 to secure the optical fiber to the ferrule. The front end of the ferrule 408 is angled in the x-z plane and is axially spaced apart from the angled back end of the collimating lens to define a gap 426 that has a corresponding axial gap distance DG.

The ferrule 408, optical fiber 416, and securing element 424 constitute a fiber optic pigtail 428, which can be said to reside at least partially within the bore 404 adjacent the back end of the glass tube 402. Thus, in an example, the square tube collimator 400 includes only the glass tube 402, collimating lens 406, and the fiber optic pigtail 428. The glass tube 402 serves in one capacity as a small lens barrel that supports and protects the collimating lens 406 and fiber optic pigtail 428, particularly the bare glass portion 420 and its polished end face 422. The glass tube 402 also serves in another capacity as a mounting member that allows for the square tube collimator 400 to be mounted to a support substrate. In this capacity, at least one flat surface 430 serves as a precision mounting surface.

In an example, the glass tube 402, the collimating lens 406, and the ferrule 408 are all made of a glass material, and further in an example, are all made of the same glass material. Making the glass tube 402, the collimating lens 406, and the ferrule 408 out of a glass material has the benefit that these components will have very close if not identical coefficients of thermal expansion (CTE). This feature is particularly advantageous in environments that can experience large swings in temperature.

In an example, the optical elements used in micro-optical systems are sized to be slightly smaller than the diameter of the bore 404 (e.g., by a few microns or tens of microns) so that the optical elements can be inserted into the bore 404 and be movable within the bore 404 to a select location. In an example, the select location is an axial position where the optical element resides for the micro-optical system to have optimum or substantially optimum optical performance. Here, substantially optimum performance means performance that may not be optimum but that is within a performance or specification for the micro-optical system.

In another example, the optical elements have a clearance with respect to the bore 404 in the range of a few microns (e.g., 2 microns or 3 microns) to tens of microns (e.g., 20 microns up to 50 microns). A relatively small value for the clearance allows for the optical elements to be well-aligned with the central bore axis AB, e.g., to within a few microns (e.g., from 2 microns to 5 microns).

The optical elements and the support/positioning elements can be inserted into and moved within the bore 404 to their select locations using micro-positioning devices. The optical elements and the support/positioning elements can be secured within the bore 404 using a number of securing techniques. One example of a securing technique uses a securing feature that is an adhesive (e.g., a curable epoxy). Another securing technique uses a securing feature that involves a glass soldering to create one or more glass solder points. Another securing technique uses glass welding to create a securing feature in the form of one or more glass welding points. A combination of these securing features can also be employed.

Thus, one or more optical elements can be secured within the bore 404 using one or more securing features, and can also be supported and/or positioned using one or more support/positioning elements. The non-adhesive securing techniques described below allow for the micro-optical systems disclosed herein to remain free of adhesives so that, for example, micro-optical systems can consist of glass only.

Figure 5A:
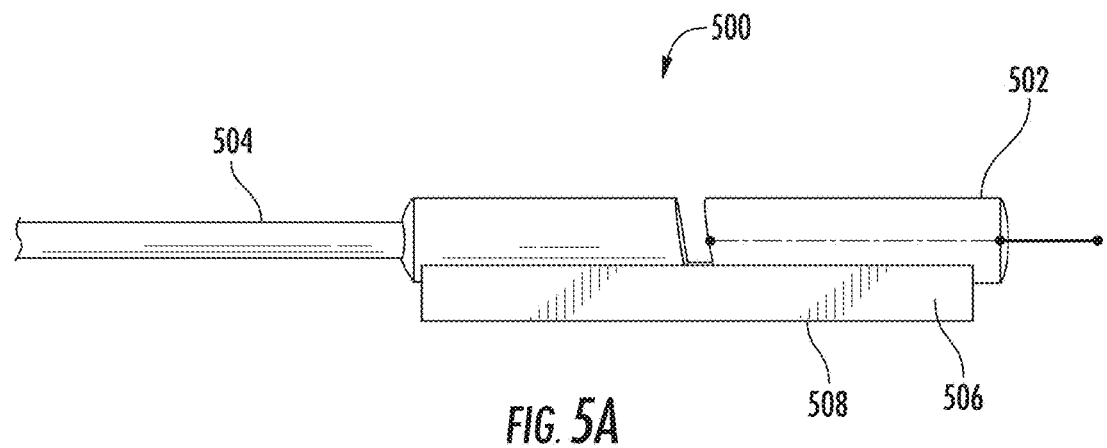
FIG. 5A is a perspective view of a compact collimator for use with the WDM optical assemblies of FIGS. 1A-1B.

FIG. 5A is a perspective view of a compact collimator for use with the WDM optical assemblies of FIGS. 1A-1B. The collimator 500 includes a lens 502 (e.g., a glass or silica collimating lens), a fiber optic pigtail 504, and a groove (e.g., a generally V-shaped groove) formed in a base 506. The lens 502 and the fiber optic pigtail 504 are disposed in the groove. The lens 502 is configured to receive a light signal provided to the WDM multiplexer/demultiplexer from an external optical transmission system or provide a light signal multiplexed or demultiplexed by the WDM to an external optical transmission system. The lens 502, for example, may be configured to receive a light signal from a fiber optic element for multiplexing or demultiplexing and/or to provide a multiplexed or demultiplexed light signal to an external fiber optic element. The fiber optic pigtail 504 is optically coupled to the lens 502 and is configured to provide a light signal to the lens 502 from the external fiber optic element and/or to receive the light signal from the lens 502 for transmission to the external fiber optic element.

In various embodiments, the lens 502 and the fiber optic pigtail 504 may or may not contact each other. The lens 502 and the fiber optic pigtail 504 may be securable to the groove independent of each other to allow for precise adjustment of a pointing angle between an optical beam from the collimator 500 and a side and/or bottom surface of the groove. In addition, the lens 502 and fiber optic pigtail 504 may have the same outer diameter.

The base 506 of the collimator 500 has a generally flat bottom surface 508 for mounting on a substrate of a WDM multiplexer/demultiplexer or other optical system. The base 506 further includes a width that is less than a width of the lens 502 and a width of the fiber optic pigtail 504.

Figure 5B:
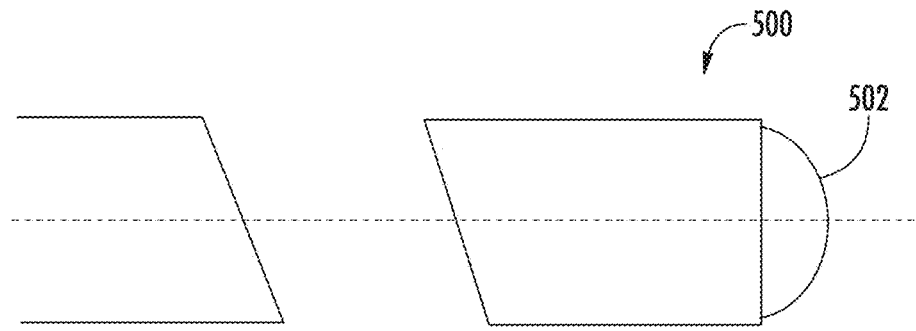
FIG. 5B is a side view of the compact collimator of FIG. 5A.

FIG. 5B is a side view of the compact collimator of FIG. 5A. A pointing angle between an optical beam from a collimator 500 and the side and bottom surface of the groove can be eliminated (or at least reduced) by controlling the relative position between the lens 502 and the fiber optic pigtail 504 of the collimator 500. By fine tuning the position of the fiber optic pigtail 504 to make an outgoing beam come across a focal point of the lens 502, a collimated zero pointing angled beam with negligible off axis offset can be achieved. In one embodiment, for example, the tuning can be monitored by near field and far field beam position comparison (e.g., using a beam scanner). The zero pointing angle collimating components are easier to attach to the substrate with little inclination, and more reliable bonding is possible due to the uniform epoxy or bonding agent. It is noted that FIG. 5B is a schematic illustration used to illustrate concepts of the description and that the ends of the glass lens and the fiber optic pigtail 504 may be oriented at other angles, including perpendicular, to the body of the glass lens and the fiber optic pigtail, respectively.

The structures of the collimator 500 allow for easier modularization and remove redundant degrees of freedom versus designs in which a collimator is coupled and attached to the substrate via external wedges or supports. Thus, the collimator 500 may reduce the complexity and further increase the assembly efficiency and process reliability of the overall multiplexer/demultiplexer design.

Figure 6A:
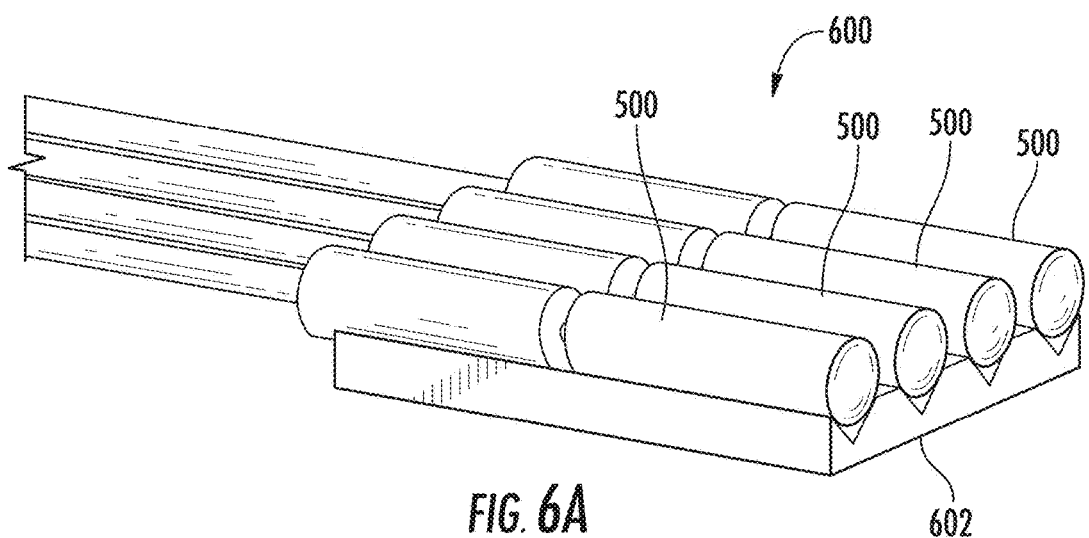
FIG. 6A is a perspective view of an array of the compact collimators of FIGS. 5A-5B.
Figure 6B:
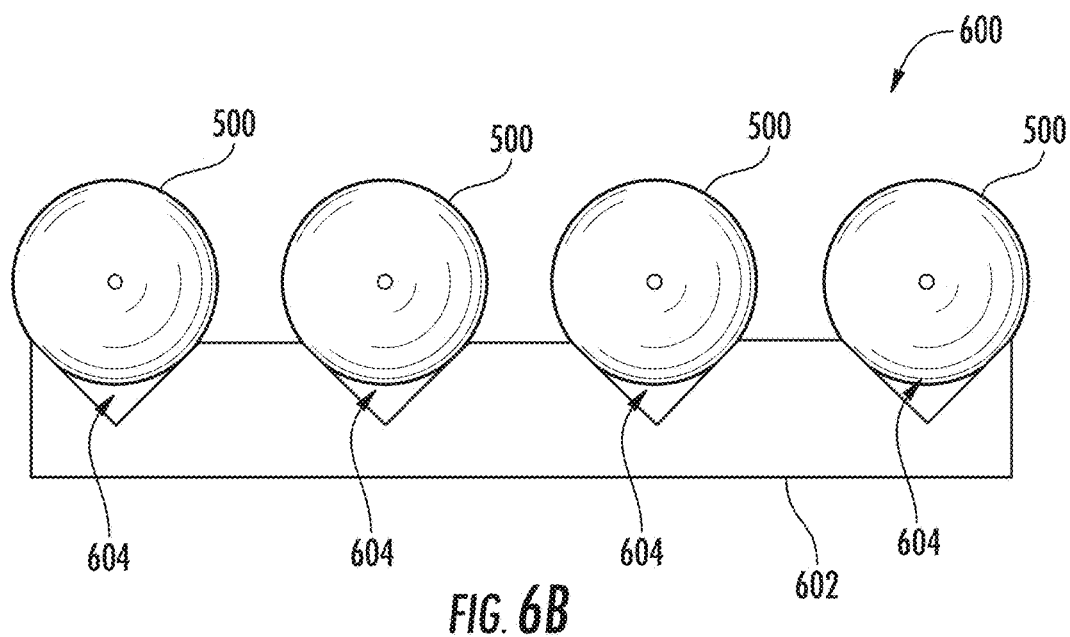
FIG. 6B is a front view of the array of compact collimators of FIG. 6A.

FIGS. 6A-6B are views of an array 600 of the collimators 500 of FIGS. 5A-5B. The collimators 500 are arranged side-by-side on a surface of a substrate 602, the substrate 602 including a plurality of grooves 604 (discussed above). The grooves 604 could be v-grooves or any other type of groove. A spacing between the substrate 602 of the side-by-side collimators 500 is greater than a spacing between the lenses 502 and fiber optic pigtails 504 of the side-by-side collimators 500.

Figure 7:
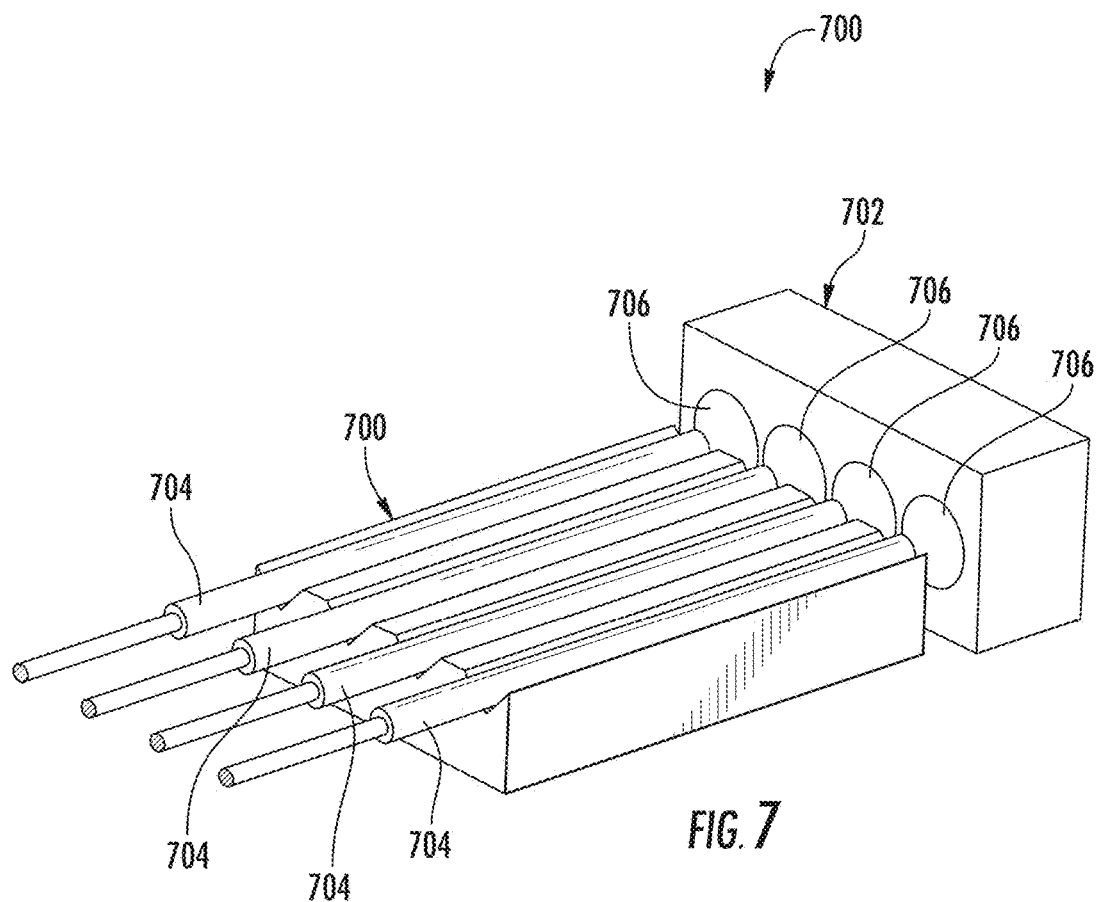
FIG. 7 is a perspective view of another exemplary embodiment of a fiber array unit (FAU) for use with the WDM optical assemblies of FIGS. 1A-1B.

FIG. 7 is a perspective view of another exemplary embodiment of a fiber array unit (FAU) 700 and multi-lens array (MLA) 702 for use with the WDM assemblies of FIGS. 1A-1B. More specifically, the FAU 700 includes a plurality of fibers 704, and the MLA 702 includes a plurality of lenses 706. The FAU 700 and MLA 702 can be used with any of the embodiments discussed above.

It will be apparent to those skilled in the art that various modifications and variations can be made without departing from the spirit or scope of the invention.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A wavelength-division multiplexing (WDM) optical assembly, comprising:
    an optical signal router having a first side and a second side opposite the first side, at least a portion of the first side comprising a reflective surface, at least a portion of the second side comprising a transmissive surface;
    a first WDM filter having a first wavelength selective surface positioned proximate the second side of the optical signal router; and
    a signal pitch router having a first surface and a second surface opposite the first surface, at least a portion of the first surface comprising a transmissive surface and at least a portion of the second surface comprising a reflective surface;
    wherein the first surface of the signal pitch router is positioned proximate and mounted to the second side of the optical signal router and a depth between the first surface of the signal pitch router and the second surface of the signal pitch router is configured to establish a pitch of a routing optical path within the optical signal router; and
    wherein the signal pitch router is positioned relative to the first WDM filter to form at least a portion of the routing optical path between the first WDM filter and a common port configured for optical communication of multiplexed signals.

2. The WDM optical assembly of claim 1, wherein the entirety of the first surface of the signal pitch router comprises the transmissive surface and the entirety of the second surface of the signal pitch router comprises the reflective surface.

3. The WDM optical assembly of claim 1, wherein the reflective surface of the second surface of the signal pitch router comprises a second wavelength selective surface.

4. The WDM optical assembly of claim 1, the first WDM filter positioned to form a first WDM optical path with a first channel port and a second WDM optical path with a second channel port.

5. The WDM optical assembly of claim 1, further comprising a second WDM filter having a second wavelength selective surface positioned proximate the second side of the optical signal router, the signal pitch router positioned relative to the second WDM filter to form at least a portion of the routing optical path between the common port and the second WDM filter.

6. The WDM optical assembly of claim 1, further comprising second, third, and fourth WDM filters positioned proximate the second side of the optical signal router.

7. The WDM optical assembly of claim 6, wherein the signal pitch router and the four WDM filters are mounted to the second side of the optical signal router.

8. A wavelength-division multiplexing (WDM) optical assembly, comprising:
    an optical signal router having a first side and a second side opposite the first side;
    a WDM filter having a wavelength selective surface positioned proximate the optical signal router; and
    a signal pitch router having a first surface and a second surface opposite the first surface, at least a portion of the first surface comprising a transmissive surface and at least a portion of the second surface comprising a reflective surface;
    wherein the first surface of the signal pitch router is positioned proximate and mounted to the second side of the optical signal router and a depth between the first surface of the signal pitch router and the second surface of the signal pitch router is configured to establish a pitch of a routing optical path within the optical signal router.

9. The WDM optical assembly of claim 8, wherein the entirety of the first surface of the signal pitch router comprises the transmissive surface and the entirety of the second surface of the signal pitch router comprises the reflective surface.

10. The WDM optical assembly of claim 8, wherein the second surface of the signal pitch router comprises a wavelength selective surface.

11. The WDM optical assembly of claim 8, wherein at least a portion of the first side of the optical signal router comprises a transmissive surface.

12. The WDM optical assembly of claim 8, wherein at least a portion of the first side of the optical signal router comprises a reflective surface.

13. The WDM optical assembly of claim 8, wherein an entirety of the second side of the optical signal router comprises a transmissive surface.

14. The WDM optical assembly of claim 8, wherein at least a portion of the second side of the optical signal router comprises a reflective surface.

15. A method of manufacturing a wavelength-division multiplexing (WDM) optical assembly, comprising:
    positioning a first wavelength selective surface of a first WDM filter proximate to an optical signal router, the optical signal router having a first side and a second side opposite the first side, at least a portion of the first side comprising a reflective surface, at least a portion of the second side comprising a transmissive surface;
    mounting a signal pitch router to the optical signal router, the signal pitch router having a first surface and a second surface opposite the first surface, at least a portion of the first surface comprises a transmissive surface and at least a portion of the second surface comprises a reflective surface, wherein the first surface of the signal pitch router is mounted to the second side of the optical signal router, a depth between the first surface of the signal pitch router and the second surface of the signal pitch router establishing a pitch of a routing optical path within the optical signal router.

16. The method of claim 15, wherein positioning the first wavelength selective surface of the first WDM filter proximate to the optical signal router includes positioning the first wavelength selective surface of the first WDM filter proximate to the second side of the optical signal router.

17. The method of claim 16, further comprising positioning the signal pitch router relative to the first WDM filter to form at least a portion of the routing optical path between the first WDM filter and a common port configured for optical communication of multiplexed signals.

18. The method of claim 15, further comprising positioning a second wavelength selective surface of a second WDM filter proximate to the second side of the optical signal router.

19. The WDM optical assembly of claim 15, further comprising mounting the signal pitch router and second, third, and fourth WDM filters to the second side of the optical signal router.

20. A wavelength-division multiplexing (WDM) device, comprising:
- a housing;
- a common collimator positioned within the housing;
- a common fiber optic pigtail coupled to the first common collimator and extending from the housing;
- a first channel collimator positioned within the housing;
- a first channel fiber optic pigtail coupled to the first channel collimator and extending from the housing;
- a second channel collimator positioned within the housing;
- a second channel fiber optic pigtail coupled to the second channel collimator and extending from the housing; and
- a WDM optical assembly, comprising:
  - a signal pitch router having a first surface and a second surface opposite the first surface, at least a portion of the first surface comprising a transmissive surface and at least a portion of the second surface comprising a reflective surface;
  - an optical signal router having a first side and a second side opposite the first side, at least a portion of the first side comprising a reflective surface, at least a portion of the second side comprising a transmissive surface; and
  - a first WDM filter having a first wavelength selective surface positioned proximate the second side of the optical signal router, the first WDM filter positioned to form a first optical path with the first channel collimator and a second optical path with the second channel collimator;
  - wherein the first surface of the signal pitch router is mounted to the second side of the optical signal router and a depth between the first surface of the signal pitch router and the second surface of the signal pitch router is configured to establish a pitch of a routing optical path within the optical signal router; and
  - wherein the signal pitch router is positioned relative to the first WDM filter to form at least a portion of the routing optical path within the optical signal router.

* * * * *